United States Patent [19]

Lewyn

[11] Patent Number: 5,163,019
[45] Date of Patent: Nov. 10, 1992

[54] BINARY CARRY CIRCUITRY

[75] Inventor: Lanny L. Lewyn, Laguna Beach, Calif.

[73] Assignee: Brooktree Corporation, San Diego, Calif.

[21] Appl. No.: 619,400

[22] Filed: Nov. 29, 1990

[51] Int. Cl.[5] .............................................. G06F 7/50
[52] U.S. Cl. ................................................... 364/786
[58] Field of Search ............... 364/784, 786, 787, 788, 364/768

[56] References Cited

U.S. PATENT DOCUMENTS

| 3,843,876 | 10/1974 | Fette et al. | 364/786 |
|---|---|---|---|
| 4,763,295 | 8/1988 | Yamada et al. | 364/786 |
| 4,766,565 | 8/1988 | Béchade et al. | 364/786 |
| 4,807,176 | 2/1989 | Yamada et al. | 364/786 |
| 4,885,716 | 12/1989 | Little | 364/786 |

Primary Examiner—Long T. Nguyen
Attorney, Agent, or Firm—Ellsworth R. Roston; Charles H. Schwartz

[57] ABSTRACT

A first switch (e.g. semiconductor) becomes conductive when at least one of two binary inputs to be added is a binary "1". A second switch (e.g. semiconductor) becomes conductive when there is a carry of a binary "1" from a preceding stage. The semiconductors provide a particular potential on an output line when both semiconductors are conductive. This potential provides a binary carry to a carry switch in the next stage. The carry switch in the next stage is an n-channel semiconductor when the carry switch in the previous stage is a p-channel semiconductor. A logical network also produces a signal when both of the binary inputs are a binary "1". This signal causes a third switch (e.g. semiconductor) to become conductive and to produce the particular voltage on the output line whether or not the particular voltage is produced on the output line by the operation of the first and second switches. The voltage on the output line is thereafter reset to a second particular value by a reset signal from a fourth switch (e.g. semiconductor). A fifth switch (e.g. semiconductor) also simultaneously receives a reset voltage to reset the common node between the first and second switches to the particular value. The first and second switches in the next state then respectively respond to a binary "1" in at least one of two binary inputs and to the carry output from the preceding stage in the manner described above.

33 Claims, 1 Drawing Sheet

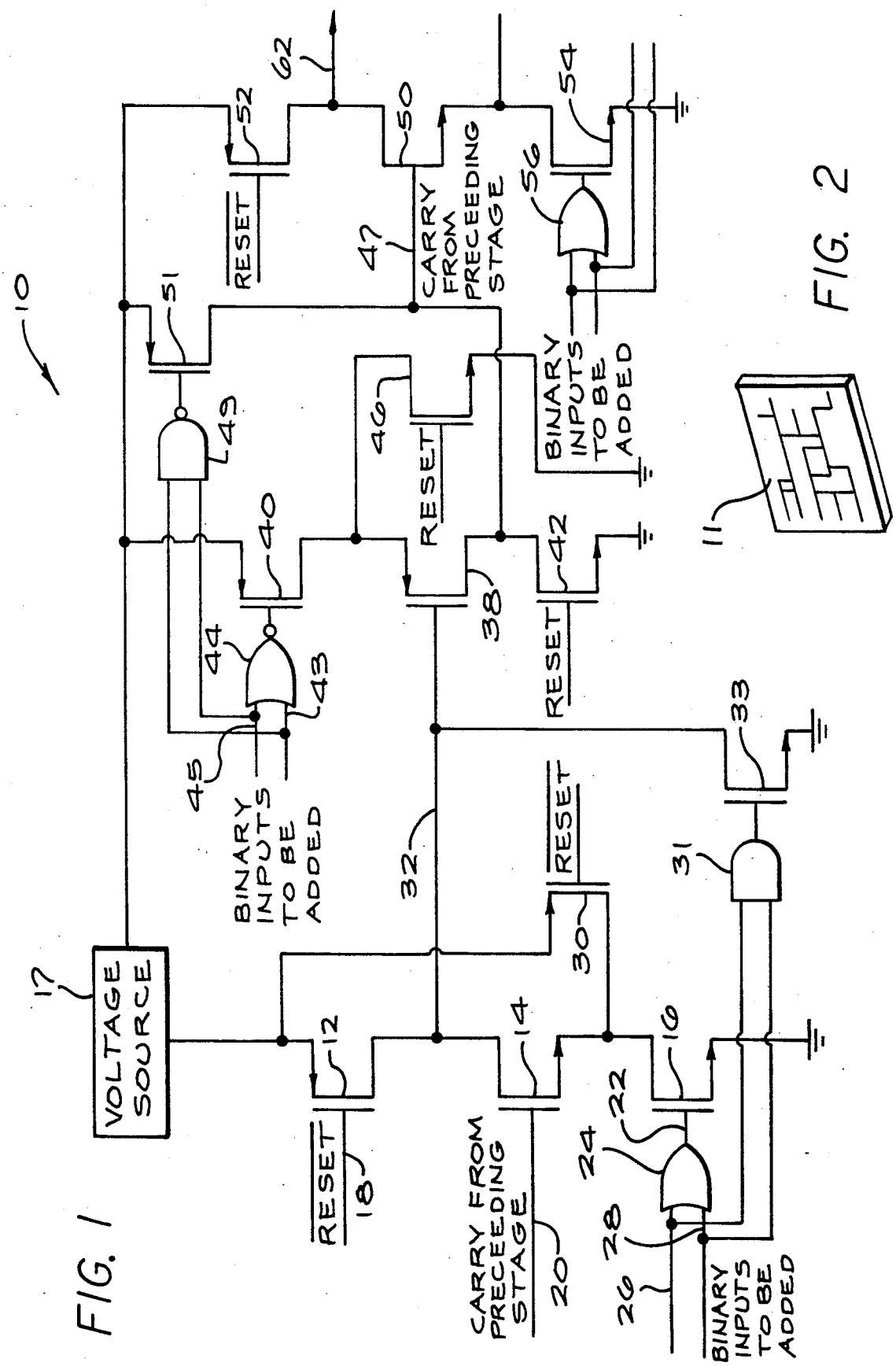
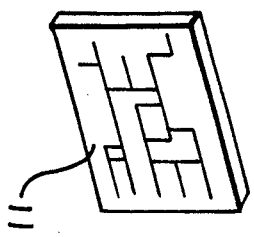
FIG. 1
FIG. 2

BINARY CARRY CIRCUITRY

This invention relates to electronic circuitry for providing a binary carry between successive stages in a binary adder. More particularly, the invention relates to an integrated circuit which occupies a minimal area on an integrated circuit chip and which operates in a minimal time to provide a carry between each successive stage and each of the next stages in a binary adder in accordance with the values of the binary inputs to the different stages in the adder and the carry from the stage preceding each such successive stage. The invention also relates to a binary adder.

BACKGROUND OF THE INVENTION

In a binary adder, two binary inputs are generally introduced to each stage in the adder. A carry may also be introduced to each such stage from the preceding stage in the adder. The two (2) binary inputs and the carry are then added in such stage to determine whether a carry will be introduced to the next stage in the adder.

Considerable work has been performed in the prior art to develop and perfect a satisfactory binary adder. In one type of binary adder in the prior art, each successive stage in the adder operates in sequence. When a stage operates, it adds the binary inputs to that stage and the carry to that stage from the preceding stage, producing a sum and a carry. The next stage adds that carry and the binary inputs to that stage to provide a sum and a carry to the following stage in the adder. Each of the stages accordingly operates sequentially after the operation of the previous stage. As will be seen, this type of binary adder is disadvantageous because it is slow. However, this type of binary adder has the advantage that it is occupies a minimal amount of space on an integrated circuit chip.

In another type of binary adder of the prior art, electrical circuitry is included in the adder for anticipating the carry from each stage to the next. Because of such anticipation, this type of binary adder is relatively fast in its operation. However, in order to provide such anticipation, the circuitry in the binary adder is quite complex because each stage must have logic that looks ahead in time to the inputs of all proceeding stages. Furthermore, the circuitry occupies a relatively large area on an integrated circuit chip.

It has been known for some time that it would be desirable to provide circuitry which provides a binary carry between successive stages in a binary adder and which is fast, simple and compact. On the basis of such knowledge, a considerable effort has been made for a considerable number of years to provide carry circuitry which meets such criteria. Such efforts have, as a practical matter, been fruitless until now.

BRIEF DESCRIPTION OF THE INVENTION

In one embodiment of the invention, a first switch (e.g. a semi-conductor) becomes conductive when at least one of a pair of binary inputs to be added is a binary "1". A second switch (e.g. a semi-conductor) becomes conductive when there is a carry of a binary "1" from a preceding stage. The semi-conductors are in series with an output line to provide a particular potential on the output line when the semi-conductors are simultaneously conductive. This potential is introduced as a binary carry output to a switch in the next stage corresponding to the second switch. The binary carry switch in the next stage is an n-channel transistor when the carry switch in the preceding stage is a p-channel transistor.

A logical network also produces a signal when both of the binary inputs are a binary "1". This signal causes a third switch (e.g. semi-conductor) to become conductive and to produce the particular voltage on the output line whether or not the particular voltage is produced on the output line by the operation of the first and second switches.

The voltage on the carry output line is thereafter reset to a second particular value as by a reset signal from a fourth switch (e.g. a semi-conductor). A fifth switch (e.g. a semi-conductor) also simultaneously receives a reset voltage to reset the common node between the first and second switches to the particular value. The first and second switches in the next stage are then able respectively to respond to a binary "1" in at least one of the next pair of binary inputs and to the binary carry output from the preceding stage in the manner described above.

In this way, a binary carry can be propagated through successive stages each receiving a carry from a preceding stage and receiving an indication of a binary "1" in at least one of a pair of binary inputs to that stage. Furthermore, the binary carry can be used in a binary adder to provide the binary carry output for each stage.

BRIEF DESCRIPTION OF THE DRAWINGS

FIG. 1 is circuit diagram in a binary carry circuit and binary adder constituting one embodiment of this invention; and FIG. 2 is a perspective view of an integrated circuit chip and schematically shows the circuitry of FIG. 1 on the chip.

DESCRIPTION OF THE PREFERRED EMBODIMENT

In one embodiment of the invention, circuitry generally indicated at 10 (FIG. 1) may be provided on an integrated circuit chip 11 (FIG. 2) for providing a binary carry from each stage to the next stage in a binary adder. Although only two complete stages and one partial stage in the adder are shown, it will be appreciated that the adder may include a plurality of additional stages of substantially identical construction. The circuitry 10 includes switches such as semi-conductors 12, 14 and 16. The semi-conductor 12 may be of the p-channel type and the semi-conductors 14 and 16 may be of the n-channel type.

The source of the semi-conductor 12 is connected to a voltage supply 17 for providing a suitable direct voltage such as approximately +5 volts when the transistors constitute C-MOS transistors. The gate of the semi-conductor 12 receives on a line 18 a reset voltage (a negative voltage approaching ground) such as a voltage approaching ground potential at a particular time after each of the stages in the binary adder has been operated to provide a binary carry, or a lack of a binary carry, to the next stage in the adder.

The drain of the semi-conductor 12 and the drain of the semi-conductor 14 have a common connection. The gate of the semi-conductor 14 receives on a line 20 a signal representing a binary carry from the preceding stage in the adder. The source of the semi-conductor 14 and the drain of the semi-conductor 16 have a common connection. The source of the semi-conductor 16 is common with a reference potential such as ground.

The gate of the semi-conductor 16 receives a signal on a line 22 from the output of an "or" gate 24. Inputs to the "or" gate 24 are provided on lines 26 and 28. The lines 26 and 28 receive the two binary inputs to be added in the stage including the semi-conductors 12, 14 and 16. These two binary inputs are introduced to the "or" gate 24 at the same time as corresponding binary inputs are introduced to corresponding "or" gates in the other stages in the adder.

A switch such as a semi-conductor 30 is also included in the adder stage including the semi-conductors 12, 14 and 16. The semi-conductor 30 may be of the p-channel type. The source of the semi-conductor 30 receives the positive voltage from the voltage supply 17. The gate of the semi-conductor 30 receives the reset signal (a negative signal approaching ground) which is also introduced to the gate of the semi-conductor 12. The drain of the semi-conductor 30 is connected to the terminal common to the source of the semi-conductor 14 and the drain of the semi-conductor 16.

The binary signals on the lines 26 and 28 (representing the binary inputs to be added) are introduced to a logical network such an "and" gate 31, which may be constructed in a conventional manner. The output from the gate 31 is introduced to a terminal of a switch such as the gate of a semi-conductor 33 which may be an n-channel type. The source of the semi-conductor 33 is at the reference potential such as ground. The drain of the semi-conductor 33 is connected to the drain of the semi-conductor 12 and the drain of the semi-conductor 14.

The carry signal from the adder stage including the transistors 12, 14 and 16 is produced on a line 32 common to the drain of the semi-conductor 12 and the drain of the transistor 14. This signal is applied to the gate of a semi-conductor 38 which operates as a switch. The semi-conductor 38 may be of the p-channel type. It corresponds in the second adder stage to the n-channel semi-conductor 14 in the first stage.

The semi-conductor 42 and semi-conductors 40 and 38 are included in a binary adder stage corresponding to the previous binary adder stage which includes the semi-conductors 12, 16 and 14. The semi-conductors 40 and 38 may be of the p-channel type and the semi-conductor 42 may be of the n-channel type. The gate of the semi-conductor 42 receives a reset signal (a positive signal) on its gate. The source of the semi-conductor 42 is common with the reference potential such as ground. The drain of the semi-conductor 42 and the drain of the semi-conductor 38 are common, as are the source of the semi-conductor 38 and the drain of the semi-conductor 40. The gate of the semi-conductor 40 is connected to the output of a "nor" gate 44 which receives on lines 43 and 45 signals representing the binary inputs to be added in the stage including the semi-conductors 38, 40 and 42.

The drain of the semi-conductor 40 and the source of the semi-conductor 38 have a common connection with a terminal of a switch such as a drain of a semi-conductor 46 which operates as a reset switch and which may be an n-channel transistor. The source of the semi-conductor 46 may be connected to the reference potential such as ground. The gate of the semi-conductor 46 receives a reset signal (a positive signal) corresponding to the signal on the gate of the semi-conductor 42.

The binary input signals on the lines 43 and 45 are introduced to a logical network such as a "nand" gate 49, which may be constructed in a conventional manner. The output of the "nand" gate 49 is introduced to a terminal of a switch such as the gate of a semi-conductor 51, which may be a p-channel type. The source of the transistor 51 receives the voltage from the voltage supply 17. The drain of semi-conductor 51 is common with the drain of the semi-conductor 38 and the drain of the semi-conductor 42.

The voltage on the drains of the semi-conductors 38 and 42 are also introduced as a carry signal through a line 47 to a terminal of a switch such as the gate of a semi-conductor 50. The semi-conductor 50 is included in a circuit with a pair of semi-conductors 52 and 54. The semi-conductor 52 may be a p-channel transistor and the semi-conductors 50 and 54 may be n-channel transistors. The gate of the semi-conductor 54 is connected to an "or" gate 56 which corresponds to the previous gate 24 and which receives a pair of binary input signals to be added (corresponding to the signals on the lines 26 and 28) The gate of the semi-conductor 52 receives a reset signal (a negative signal) corresponding to the signals introduced to the gates of the semi-conductors 12 and 30. The semi-conductors 50, 52 and 54 are shown in a partial third stage corresponding to the first stage including the semi-conductors 12, 14 and 16 to provide a binary carry. It is believed that the construction of this third stage will be seen from the construction of the first stage. The third stage is connected to a fourth stage which may be constructed like the second stage (e.g. the semi-conductors 38, 40 and 42).

The circuitry shown in FIG. 1 operates to pass a carry from each stage in the binary adder 10 to the next stage in the adder when there is at least one binary "1" in the binary inputs to be added and there is a carry of a binary "1" from the preceding stage in the binary adder. The "or" gate 24 passes a positive signal to the gate of the semi-conductor 16 when the signal on at least one of the lines 26 and 28 is positive to represent a binary "1". This causes the semi-conductor 16 to become conductive so that the voltage on the source of the semi-conductor approximates the reference potential such as ground. When there is a binary carry of "1" from the preceding stage, a positive signal is produced on the line 20. This signal causes the semi-conductor 14 to become conductive.

The width of semi-conductor 16 is made large in comparison to the width of the semi-conductor 14. The semi-conductor 16 usually responds to the signals on its gate before a carry signal is passed to the gate of the semi-conductor 14. Because of this, when the semi-conductor 14 becomes conductive and the semi-conductor 16 is already conductive, a voltage rapidly approaching the reference potential such as ground is produced on the output line 32.

The carry output signal approaching ground on the line 32 is introduced to the gate of the semi-conductor 38 to produce a state of conductivity in the semi-conductor. The binary inputs have been previously introduced to the "nor" network 44 at the same time as the introduction of the binary inputs to the "or" gate 24. Furthermore, the semi-conductor 40 is larger in width than the width of semi-conductor 38. Because of this if the semi-conductor 40 is conductive because of a binary "1" on at least one of the binary inputs to the "nor" gate 44, a voltage approaching the potential from the supply 17 is introduced to the gate of the semi-conductor 40 when the semi-conductor 38 becomes conductive to indicate a binary carry.

The positive carry output signal produced on the drain of the semi-conductor 38 is introduced through the line 47 to the gate of the semi-conductor 50 to make the semi-conductor 50 conductive. When a signal passes through the "or" network 56 to indicate that one of the binary inputs to be added is a binary "1" and there is a carry signal on the line 47, a signal is produced on a line 62 from the drain of the semi-conductor 50 to indicate that there is a binary carry output.

In this way, a carry output signal can be propagated in successive stages in a binary adder provided that there is a binary "1" in at least one of the binary inputs to be added in that stage. The propagation of the binary carry output in the successive stages can occur very rapidly. For example, the propagation of the binary carry output in each stage can occur in less than one hundred (100) picoseconds. This is less than the delay occurring in one stage of a simple inverter chain where the stage delay is on the order of one hundred and twenty (120) picoseconds. Thus, the total propagation delay for a 32-bit adder may be on the order of 3.2 nanoseconds.

The binary inputs on the lines 26 and 28 are also introduced to the "and" gate 31. The "and" gate 31 introduces a signal to the gate of the transistor 33 to make the transistor conductive when the inputs to both lines are a binary "1". However, the semi-conductor 33 will become conductive to produce a binary carry output signal on the line 32 whether or not a binary carry output signal has been previously produced on the line 32 by the operation of the semi-conductors 12, 14 and 16. The semi-conductor 33 passes a switching current when a high voltage is initially on the line 32 because there is no binary carry output, or no binary carry output has yet arrived, from the stage including the transistors 12, 14 and 16.

In like manner, the "nand" network 49 produces a low voltage on its output when both of the binary inputs are a binary "1". This causes the semi-conductor 51 to become conductive whether or not there is not a binary carry output signal on the line 47 as a result of the operation of the second stage, which includes the semi-conductors 38, 40 and 42. If there is not such a binary carry output signal on the line 47, the semi-conductor 51 passes current and causes the binary carry output line 47 to be pulled up to the supply voltage 17.

Since the semi-conductors 16 and 40 are relatively large, relatively large distributed capacitances are associated with these semi-conductors. Because of this, some means should be provided to initialize (or reset) the voltage across the semi-conductors 16 and 40. This is provided for the semi-conductor 16 by the semi-conductor 30. When the semi-conductor 30 receives a negative reset signal on its gate, it becomes conductive and causes a voltage approaching that from the voltage source 17 to be produced on its drain. This voltage is introduced to the drain of the transistor 16.

It will be appreciated that the negative reset signal is introduced to the gate of the semi-conductor 30 after all of the carry signals have been propagated in the successive stages in the binary carry circuit shown in FIG. 1 and after the binary carry for each stage has been added with the binary inputs to that stage. The negative reset signal may be produced in synchronism with a clock signal.

The negative reset signal is also introduced to the gate of the semi-conductor 12 at the same time as the introduction of the negative reset signal to the gate of the semi-conductor 30. The negative reset signal on the gate of the semi-conductor 12 causes the semi-conductor to become conductive and a voltage approaching the source 17 to be produced on the output line 32. In this way, the output line 32 becomes reset so that it is ready to receive a new carry signal from the preceding stage.

After the binary carry output has been produced in the stage represented by the semi-conductors 38, 40 and 42 and the addition has been performed by the "nand" gate 49, a reset signal (a positive signal) is introduced to the gate of the semi-conductor 42 to have the potential on the drain of the semi-conductor approach the reference potential such as ground. A reset signal (a positive signal) is also introduced to the gate of the semi-conductor 46 to have the potential on the drain of the semi-conductor and on the source of the semi-conductor 38 approach ground.

In addition to propagating the binary carry through successive stages in a minimal period of time, the binary carry circuitry described above has certain other important advantages. For example, the binary carry circuitry occupies a relatively small amount of space on an integrated circuit chip. This is certainly true in comparison to any circuitry for anticipating binary carries in the prior art. This results in part from the fact that the binary carry circuitry of this invention is less complex than the binary circuitry of the prior art. The binary carry circuit of this invention is also advantageous because it can be conveniently operated with the signals normally used in binary adders.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination for providing a controlled passage of a binary carry from a first stage to a second stage when at least a pair of binary inputs are added in the first stage to each other and to a carry from a stage preceding the first stage, first means for providing a first voltage having a first binary value when at least one of the binary inputs is a binary "1" and having a second binary value when none of the binary inputs is a binary "1", second means for providing a second voltage having a first binary value when a carry from a previous stage is a binary "1" and having a second binary value when the carry from the previous stage is a binary "0", third means operatively coupled to the first and second means for providing a binary carry output voltage having a first binary value when the first and second voltages have the first binary value and having a second binary value when at least one of the first and second voltages has the second binary value, fourth means for using the binary carry output voltage as the binary carry signal in the second stage, and fifth means operatively coupled to the third means for resetting the binary carry output voltage in the third means to the second binary value after the production of the binary carry output voltage from the third means in the first stage and before the introduction of the next carry from the previous stage to the second means in the first stage and before the introduction of the next binary inputs to the first means in the first stage.

2. In a combination as set forth in claim 1,
sixth means operatively coupled to the common terminal between the first and second means for resetting the voltage on this common terminal after the production of the binary carry output voltage from the third means in the first stage and before the introduction of the next carry from the previous stage to the second means in the first stage and before the introduction of the first voltage inputs to the first means in the first stage in representation of the next binary inputs,
the first and second means being connected in series and having a common terminal between the fifth and sixth means.

3. In a combination as set forth in claim 2,
each of the first and second means including an n type of transistor and each of the fourth, fifth and sixth means including a p type of transistor.

4. In a combination as set forth in claim 1,
the first and second means including an n type of transistor and the fourth and fifth means including a p type of transistor.

5. In a combination as set forth in claim 1,
the first and second means including a p type of transistor and the fourth and fifth means including an n type of transistor.

6. In a combination as set forth in claim 1,
means for adding the binary inputs to produce a signal when both of the binary inputs are a binary "1", and
the third means being responsive to the signal from the last mentioned means for producing the binary carry output voltage.

7. In combination for providing a controlled passage of a binary carry from a first stage to a second stage when at least a pair of binary inputs are added in the first stage to each other and to a binary carry from a stage preceding the first stage,
first switching means having conductive and non-conductive states and responsive to the binary inputs to the first stage to become conductive when at least one of the binary inputs is a binary "1",
second switching means having conductive and non-conductive states and responsive to the binary carry from a stage preceding the first stage to become conductive when such a binary carry indicates a binary carry of "1" from the preceding stage,
an output line,
the first and second switching means being connected in circuitry with the output line to produce on the output line a particular voltage when the first and second switching means are simultaneously conductive, and
third switching means having conductive and non-conductive states and responsive to the voltage on the output line to become conductive when the particular voltage is produced on the output line, the third switching means being operative in the conductive state to provide a binary carry output to the second stage,
the first switching means being constructed to become conductive before the second switching means.

8. In a combination as set forth in claim 7,
a pair of binary inputs being provided to the second stage, the binary inputs to the second stage being different from the binary inputs to the first stage, and
fourth switching means having conductive and non-conductive states and responsive to the conductive state in the third switching means and to the binary inputs to the second stage and included in the second stage to become conductive for indicating a carry from the second stage.

9. In a combination as set forth in claim 7,
there being binary inputs to the second stage,
fourth switching means having conductive and non-conductive states and responsive to the binary inputs to the second stage to become conductive when at least one of the binary inputs is a binary "1",
a second output line,
the third and fourth switching means being connected in circuitry with the second output line to produce on the second output line a second particular voltage when the third and fourth switching means are simultaneously conductive, and
fifth switching means having conductive and non-conductive states and responsive to the voltage on the second output line to become conductive when the second particular voltage is produced on the second output line, the fifth switching means being operative in the conductive state to indicate a binary carry output from the second stage,
the first, second and fifth switching means constituting semi-conductors of a particular one of the p and n types,
the third and fourth switching means constituting semi-conductors of the other one of the p and n types.

10. In a combination as set forth in claim 9,
first resetting means operatively coupled to the first output line for resetting the voltage on the first output line to a voltage different from the first particular voltage after the introduction of the binary carry output to the second switching means and the response of the first switching means to the binary inputs, the first resetting means constituting semi-conductors of the other one of the p and n types, and
second resetting mans operatively coupled to the second output line for resetting the voltage on the second output line to a voltage different from the second particular voltage after the introduction of the binary carry output to the third switching means and the response of the fourth switching means to the binary inputs, the second resetting means constituting semi-conductors of the particular one of the p and n types.

11. In a combination as set forth in claim 7,
means responsive to the binary inputs for producing a signal when both of the binary inputs are a binary "1", and
means responsive to the signal from the last mentioned means for producing the particular voltage on the output line.

12. In combination for providing a controlled passage of a carry from a first stage to a second stage when at least a pair of binary inputs are added in the first stage to each other and to a binary carry from a stage preceding the first stage, first switching means having conductive and non-conductive states and responsive to the binary inputs for becoming conductive when at least one of the binary inputs is a binary "1", second switching means having conductive and non-conductive stages and responsive to the binary carry from the preceding stage for becoming conductive when the binary carry from the preceding stage is a binary "1", an output line, means operatively coupled to the first and second switching means and the output line for providing for the production of a particular voltage on the output line when the first and second switching means are simultaneously conductive, and means operatively coupled to the output line for resetting the output line to a voltage different from the particular voltage after the introduction of the binary inputs to the first switching means and the introduction of the binary carry from the preceding stage to the second switching means, the first switching means having a faster response time than the second switching means.

13. In a combination as set forth in claim 12, third switching means having conductive and non-conductive states, and means for introducing the voltage on the output line to the third switching means to obtain the production of the conductive state in the third switching means when the particular voltage is produced on the output line, the first and second switching means having a common terminal, and means operatively coupled to the terminal common to the first and second switching means for resetting the voltage on the common terminal to a voltage corresponding to a non-conductive state in the second switching means.

14. In a combination as set forth in claim 13, there being binary inputs to the second stage, the binary inputs to the second stage being different from the binary inputs to the first stage, fourth switching means having conductive and non-conductive states and responsive to the binary inputs to the second stage to become conductive when at least one of such binary inputs is a binary "1", a second output line, and means operatively coupled to the third and fourth switching means and the second output line for providing for the production of a second particular voltage on the second output line when the third and fourth switching mans are simultaneously conductive, the first and second switching means including semi-conductors of a particular one of n and p types, and the third and fourth switching means including semi-conductors of the other one of the n and p types.

15. In a combination as set forth in claim 14, the first and second switching means being in series to provide a common terminal between the first and second switching means, the first and second switching means including semi-conductors of the p type, the particular voltage on the output line being at a potential different from ground, and means including a semi-conductor of the n-type for resetting the common terminal between the first and second switching means to a potential approaching ground after the introduction of the binary inputs to the first switching means and the introduction of the binary carry from the preceding stage to the second switching means.

16. In a combination as set forth in either of claims 12 or claim 13, the first and second switching means being in series to provide a common terminal between the first and second switching means, the first and second switching means including semi-conductors of the n-type, the particular voltage on the output line being at ground, and means including a semi-conductor of the n-type for resetting the common terminal between the first and second switching means to a voltage different from ground after the introduction of the binary inputs to the first switching means and the introduction of the binary carry from the preceding stage to the second switching means.

17. In a combination as set forth in claim 12, means for adding the binary inputs to produce a signal when both of the binary inputs are a binary "1", and third switching means responsive to the signal from the last mentioned means and operative before the resetting of the output line for producing the particular voltage on the output line.

18. In combination for providing a controlled passage of a binary carry from a first stage to a second stage when at least a pair of binary inputs are added in the first stage to each other and to a binary carry from a stage preceding the first stage, a first semi-conductor having a gate, a source and a drain and having conductive and non-conductive states, means for introducing to the gate of the first semi-conductor a first signal having first and second logic levels and having the first logic level to indicate a binary "1" in at least one of the binary inputs to the first stage and having the second logic level to indicate a binary "0" in both of the binary inputs to the first stage, the first semi-conductor being constructed to become conductive upon the introduction of the first signal of the first logic level to its gate, a second semi-conductor having a gate, a source and a drain and having conductive and non-conductive states, means for introducing to the gate of the second semi-conductor a second signal having first and second logic levels and having the first logic level to indicate a binary carry of a binary "1" from the preceding stage and having a second logic level to indicate a binary carry of a binary "0" from the preceding stage, the second semi-conductor being constructed to become conductive upon the introduction of the second signal of the first logic level to its gate, the drain of the first semi-conductor being connected to the source of the second semi-conductor, potential means for providing a particular potential, the source of the first semi-conductor being coupled to the potential means, an output line connected to the drain of the second semi-conductor to produce the particular potential on the output line in accordance with the states of conductivity of the first and second semi-conductors, and means for applying a potential different from the particular potential to the drain of the second semi-conductor after the production of the binary carry output voltage on the output line to discontinue any conductivity of the second semi-conductor the first semi-conductor having a larger width than the second semi-conductor to become conductive before the second semi-conductor.

19. In a combination as set forth in claim 18, a third semi-conductor having a gate, a source and a drain and having conductive and non-conductive states, means for introducing to the gate of the third semi-conductor a third signal having first and second logic levels and having the first logic level to indicate a binary "1" in at least one of the binary inputs to the second stage and having the second logic level to indicate a binary "0" in both of the binary inputs to the second stage, the third semi-conductor being constructed to become conductive upon the introduction of the third signal of the first logic level to its gate, a fourth semi-conductor having a gate, a source and a drain and having conductive and non-conductive states, means for introducing the output voltage to the gate of the fourth semi-conductor to indicate the binary carry output from the first stage, the fourth semi-conductor being constructed to become conductive upon the occurrence of the binary carry output voltage on the output line, the drain of the third semi-conductor being connected to the source of the fourth semi-conductor, second potential means for providing a second particular potential, the source of the third semi-conductor being connected to the second potential means, a second output line connected to the drain of the fourth semi-conductor to produce the second particular potential on the second output line in accordance with the states of conductivity of the third and fourth semi-conductors, and means for applying the first particular potential to the source of the fourth semi-conductor after the production of the second particular potential on the second output line to discontinue any conductivity of the fourth semi-conductor, the first and second semi-conductors being a particular one of the p and n types, the third and fourth semi-conductors being the other one of the p and n types, the third semi-conductor having a larger width than the fourth semi-conductor.

20. In a combination as set forth in claim 18, means for producing a voltage different than the first particular potential on the first output line after the production of the first particular potential on the first output line, and means for producing a voltage different than the second particular potential on the second output line after the production of the second particular potential on the second output line.

21. In a combination as set forth in claim 20, the first and second semi-conductors being of the p type and the first particular potential constituting ground and the third and fourth semi-conductors being of the n type and the second particular potential constituting an energizing voltage.

22. In a combination as set forth in claim 18, means for adding the binary inputs to the first stage and for producing a signal when both of the binary inputs are a binary "1", and means for producing the binary carry output voltage on the output line in response to the signal from the last mentioned means.

23. In combination for providing a controlled passage of binary carries between pairs of successive stages in a plurality when at least pairs of binary inputs are added in each of such stages to each other and to a binary carry to each of such stages from a preceding stage in the plurality, first means in each of such stages for providing a first particular output in response to a binary "1" for at least one of the binary inputs to such stage, second means in each of such stages for providing a second particular output in response to a carry of a binary "1" from the preceding stage, third means for simultaneously introducing to each of the first means binary indications of whether the binary inputs to such first means have at least one binary "1", the binary inputs to each of such first means being individual to such first means, fourth means responsive to the outputs from the first and second means for each stage for producing a voltage representing a binary carry output of a binary "1" from that stage when the first means for such stage produce the first particular output for that stage and the second means for such stage simultaneously produces the second particular output for that stage, and fifth means for introducing the voltage representing the binary carry output of the binary "1" from each stage to the second means in the next stage, the first means and the second means for each stage respectively including first and second semi-conductors, the first and second semi-conductors for alternate stages constituting a particular one of the n and p transistors and the first and second semi-conductors for the other stages constituting the other one of the n and p transistors.

24. In a combination as set forth in claim 23, sixth means operatively coupled to the fourth means for each stage for resetting such fourth means to a voltage different form the voltage representing the binary carry output of the binary "1" after the production of the voltage representing the binary carry output of the binary "1" from that stage.

25. In a combination as set forth in claim 23, sixth means operatively coupled to the fourth means for each stage for resetting such fourth means for that stage to a voltage eliminating the binary carry output from that stage after the production of the signals representing the binary carry outputs for all of the stages, an integrated circuit chip, the first, second, third, fourth, fifth and sixth means for all of the stages being formed on the integrated circuit chip, the first and second semi-conductors in each stage being in series and having a common terminal providing a particular voltage when the binary carry output is produced for that stage, and seventh means operatively coupled to the common terminal between the first and second semi-conductors for each stage for resetting the voltage at the common terminal from the particular voltage after the production of the signals representing the binary carry output for that stage.

26. In a combination as set forth in claim 25,
each of the first and second means for alternate stages including an n-channel type transistor, and
each of the sixth and seventh means for such alternate stages including a p-channel type transistor.

27. In a combination as set forth in claim 26,
each of the first and second means for the other stages including a p-channel type of transistor, and
each of the sixth and seventh means for such other stages including an n-channel type of transistor.

28. In a combination as set forth in claim 25,
means for adding the binary inputs to the stage to produce a signal when both of the binary inputs are a binary "1", and
the fourth means being responsive to the signal from the last mentioned means for producing the voltage representing the binary carry output before the resetting of the fourth means,
the width of the first semi-conductive means in each stage being larger than the width of the second semi-conductor means in such stage.

29. In combination for providing a controlled passage of binary carries between pairs of successive stages in a plurality when at least pairs of binary inputs are added in individual ones of such stages to each other and to a binary carry to each of such individual stages from a preceding stage in the plurality,
first semi-conducting means in each of the stages for providing for a flow of current through such first semi-conducting means when at least one of the binary inputs to such stage has a binary "1",
second semi-conducting means in each of the stages for providing a flow of current through such second semi-conducting means when there is a binary "1" for the binary carry in such second semi-conducting means, and
third semi-conducting means responsive in each stage to the flow of current through the first and second semi-conducting means for that stage for introducing to the second semi-conducting means in the next one of the stages a signal representing a binary carry output of a binary "1",
the first and second semi-conducting means for each alternate stage including n-channel types of transistors,
the third semi-conducting means for each such alternate stage including a p-channel type of transistor.

30. In a combination as set forth in claim 29,
fourth semi-conducting means for each stage for interrupting the flow of current through the second semi-conducting means for such stage after the introduction to the second semi-conducting means in the next stage of a signal representing a binary carry output of a binary "1",
the fourth semi-conducting means for each of the alternate stages including a p-channel type of transistor.

31. In a combination as set forth in claim 30,
an integrated circuit chip,
the first, second, third and fourth semi-conductor means for each stage being formed on the integrated circuit chip.

32. In a combination as set forth in claim 30,
fifth semi-conducting means for each stage for resetting the signal representing the binary "1" in the third semi-conducting means after the introduction to the second semi-conducting means in the next stage of a signal representing a binary carry output of a binary "1",
the fifth semi-conducting means for each alternate stage including a p-channel type of transistor.

33. In a combination as set forth in claim 32,
the first and second semi-conducting means for each of the other stages including p-channel types of transistors,
the third semi-conducting means for each of such other stages including an n-channel type of transistor,
the fourth and fifth semi-conducting means for each of the other stages including a p-channel type of transistor.

* * * * *